United States Patent [19]
Gardner

[11] Patent Number: 4,485,704
[45] Date of Patent: Dec. 4, 1984

[54] INSTRUMENT ATTACHMENTS FOR RADIUS WORKING MACHINES

[75] Inventor: Charles C. Gardner, Los Angeles, Calif.

[73] Assignees: Lawrence H. Higa; Charles C. Gardner, both of Los Angeles, Calif.; a part interest

[21] Appl. No.: 357,402

[22] Filed: Mar. 12, 1982

[51] Int. Cl.³ .................. B23B 25/06; B23Q 17/00
[52] U.S. Cl. ............................. 82/34 A; 408/14; 116/230; 116/231; 33/181 R; 33/185 R; 82/34 B; 82/34 D
[58] Field of Search .............. 82/34 A, 34 B, 34 D; 408/14; 33/181 R, 185 R; 116/230, 231

[56] References Cited

U.S. PATENT DOCUMENTS

| | | | |
|---|---|---|---|
| 2,406,793 | 9/1946 | Benkoe | 82/34 R |
| 2,658,283 | 11/1953 | Ciccone | 82/34 R |
| 3,067,521 | 12/1962 | Platt | 82/34 R |
| 3,636,914 | 1/1972 | Speed | 82/34 A |
| 3,724,964 | 4/1973 | Needham | 82/34 D |
| 4,251,922 | 2/1981 | Perlotto | 33/181 R |
| 4,382,394 | 5/1983 | Morin | 82/34 D |

FOREIGN PATENT DOCUMENTS

| | | | |
|---|---|---|---|
| 547189 | of 1957 | Canada | 82/34 B |
| 339218 | of 1903 | France | 82/34 D |
| 1111273 | of 1956 | France | 82/34 B |
| 548474 | of 1959 | France | 82/34 D |
| 150763 | of 1955 | Sweden | 82/34 B |
| 6583 | of 1902 | United Kingdom | 82/34 A |

OTHER PUBLICATIONS

American Machinist, Jan. 15, 1948, p. 120.

*Primary Examiner*—Francis S. Husar
*Assistant Examiner*—Jerry T. Kearns
*Attorney, Agent, or Firm*—Poms, Smith, Lande & Rose

[57] ABSTRACT

A measuring attachment is shown for use on a lathe or other machine tool which includes a pair of parallel bars or slots, one associated with the saddle of the lathe and the other associated with the cross slide. Mounted upon the parallel bars (or within the slots) are a pair of blocks each including a latching arm that latches each block to one bar or the other. A single stop is mounted on the first block, while a group of several stops may be mounted upon the second block. When an outer diameter is to be cut, the several stops may be attached to the bar mounted upon the radially fixed saddle. In this arrangement, the shortest of the several stops is used as the center line reference against which the single stop engages. The longest of the several stops provides the reference for the first outer diameter cut. When an inner diameter cut is to be made, the block mounting the several stops may be attached to the bar which is mounted upon the cross slide. In this arrangement, the longest of several stops represents the center line of the workpiece, while the shorter stop represents the largest inner diameter cut.

18 Claims, 8 Drawing Figures

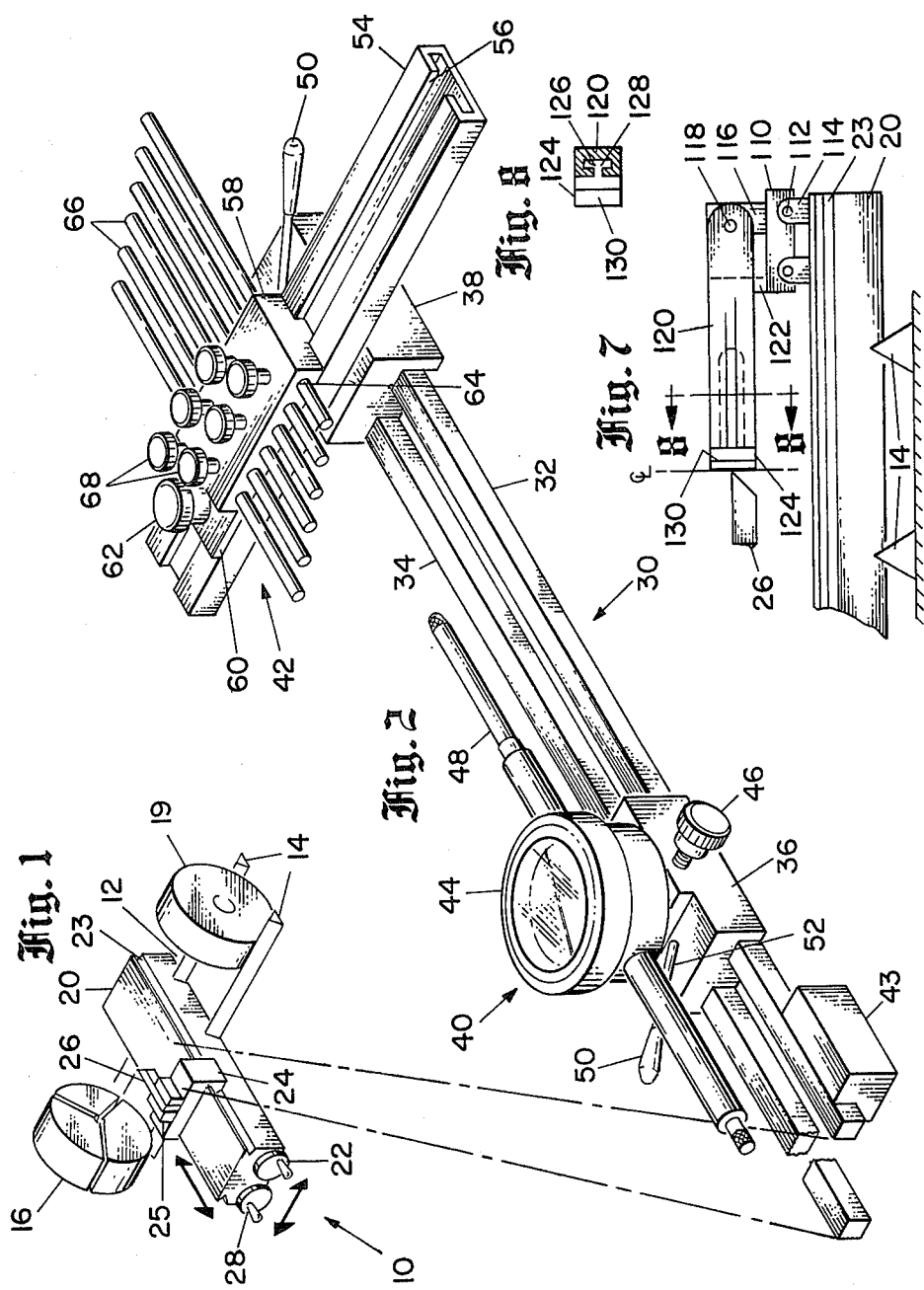

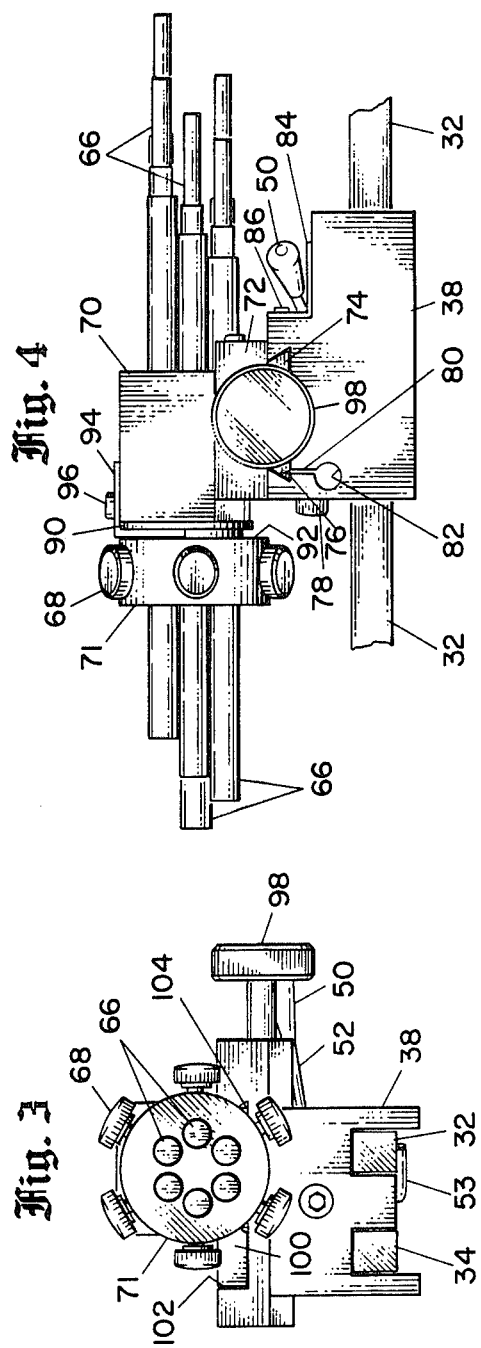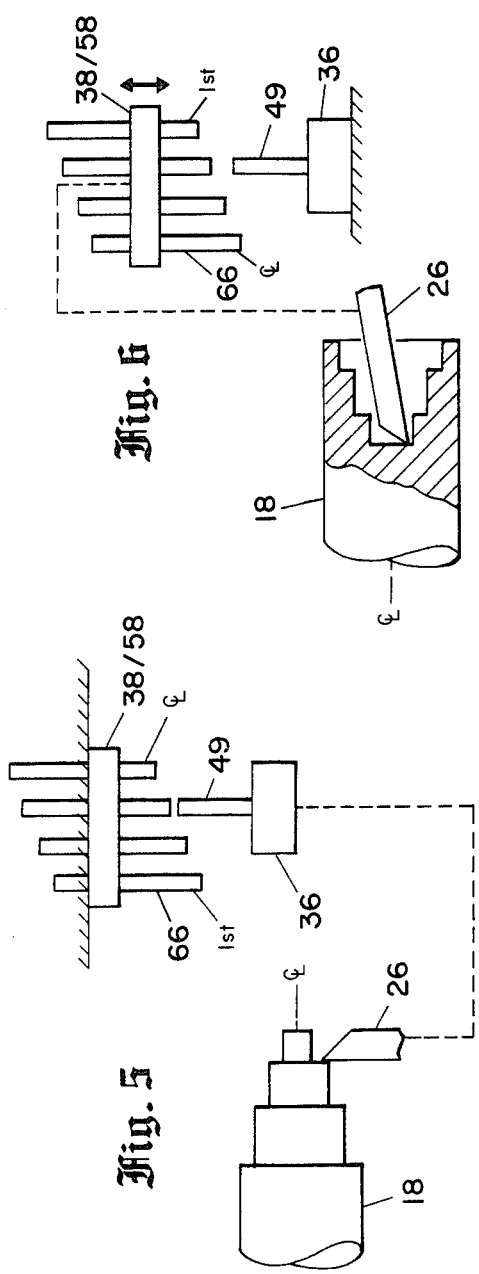

INSTRUMENT ATTACHMENTS FOR RADIUS WORKING MACHINES

The present invention relates to instrument attachments which may be used on machine tool and, more particularly, to attachments designed to make the machining of precision parts within a machine tool simple enough for an inexperienced machinist.

BACKGROUND OF THE INVENTION

In the prior art, metal working machines for turning workpieces require a machinist to calculate a radius to be cut based on drawings or specifications stated in diameters. Once the radius is known, the machinist must rely on vernier calipers, micrometers and gauges to measure the cut made on the workpiece. The ideal model for any machine tool is a device which provides a direct indicator reading, such as a jig bore, which gives the machinist an accurate way of measuring the machining of the workpiece.

However, a typical machine tool such as a lathe, mill or boring machine may not include built-in indicators. At best, short of expensive tape attachments, the machines have precision threaded lead screws where accuracy is dependent on counting the number of turns of a handle.

While dial indicators can be attached to lathes to measure the movement of a cutting tool along the longitudinal axis of the workpiece, lathes have no provision for the mounting of a cross slide indicator for measuring the dimensions of the radial cuts. Milling machines are designed such that an indicator can be easily mounted. However, they are not designed for measuring in both cutting directions. Further, devices for measuring exist for automatic lathes which may be used for high production; but these devices are prohibitively expensive for the small machine shop and for low production.

In today's economy, there is a shortage of vital skills in the machine tool industry. This shortage of specialized tradespeople such as skilled machinists, jig-and-fixture experts, tool-and-die makers, and pattern makers will be exasperated by the biggest peacetime defense buildup in U.S. history under the programs of the present administration.

SUMMARY OF THE INVENTION

Accordingly, it is the object of the invention to provide an instrument attachment for making the production of parts easier, thereby reducing time and cost for the production of single and low quantity pieces.

Another object of the present invention is to remove the necessity of calculating a radius from a specified diameter by providing a 2:1 measurement scale on an instrument attachment. This attachment permits a physical measurement of a radius while reading a diameter measurement.

Yet, another object of the present invention is to provide an attachment including a dial indicator for measuring the inner and outer diameters of a workpiece while it is being worked on a machine tool. This is accomplished by setting multiple diameters to be cut on the device. The device is then mounted on the machine. As the cut is being made, the machinist can look at a dial indicator mounted on the device to determine how much more cutting needs to be done while the piece is being cut. This eliminates the necessity of counting the number of turns made on a graduated handle, stopping the cutting to measure the workpiece, and then continuing the cutting. This also relieves the machinist of having to know the degree of inaccuracy that is associated with the machine tool at the time of the cut. Whenever a machinist can use a dial indicator while doing machine work, accuracy is increased and spoilage is correspondingly decreased.

Still, another object of the present invention is to provide an instrument attachment which will quickly and economically establish the various diameters to which a piece is being worked in such a way that, once established, the same dimensions may be repeated for a plurality of pieces.

A further object of the present invention provides that once an inner diameter is established, the complementing outer diameter measurement is automatically established. In the present inventions, a complementing outer diameter exactly fits over a piece with a complementing inner diameter.

Yet, a further object of the present invention is to provide a device which is capable of measuring inner and outer diameters and which may be used as a jig fixture, once set, for making the same part on several occasions or on different machines.

In accomplishing these and other objects there is provided a measuring device consisting of a pair of parallel bars or slots upon which a pair of blocks are slidably mounted. Each block carries a measurement device, including an indicator and adjustable clamping means. Reversal of the clamping means insures that the measurement of the cut will always be referenced from the indicator even as the cutting is reversed from inside to outside. Depending on whether inner or outer diameters are to be measured, the blocks may be clamped to one bar or slot or the other. Changing the clamping of the block from one bar or slot to the other is accomplished quickly and easily by changing an adjustable lock arm to its opposite position.

DESCRIPTION OF THE DRAWINGS

A better understanding of the objects outlined above and others will be had after consideration of the following specification and drawings wherein:

FIG. 1 is a perspective view of a typical radius working machine;

FIG. 2 is a perspective view showing an instrument attachement for a radius working machine which measures outer and inner diameters in accordance with the present invention;

FIG. 3 is an end view of a rotary mounted, multiple stop used within the present invention;

FIG. 4 is a side view of the multiple stop shown in FIG. 3;

FIG. 5 shows typical outer diameter cuts and a multiple stop arrangement which might be utilized to make such cuts;

FIG. 6 shows typical inner diameter cuts and a multiple stop that might be used to make such cuts;

FIG. 7 is an end view of a center locator used in the present invention; and

FIG. 8 is a cross-sectional view taken along line 8—8 of FIG. 7.

DESCRIPTION OF THE PREFERRED EMBODIMENTS

Referring now to the drawings, FIG. 1 shows a typical machine tool, such as a lathe 10, comprising a lathe bed 12 mounted upon a suitable frame, not shown, that includes a pair of ways 14 formed with a triangular cross section. A collet or three jaw chuck 16 receives a workpiece 18, FIGS. 5 and 6, to be worked between the collet and a tail stock 19. Mounted upon the ways 14 is a saddle 20 which may be moved by gearing, not shown, in a longitudinal direction along the axis of the workpiece 18 formed between the center of the collate 16 and tail stock 19. The gearing may be activated by the graduated handle 22. The upper portion of the saddle 20 includes a pair of inwardly directed V-shaped grooves 23 which receive a compound cross slide 24 which mounts a cutting tool holder 25 and cutting tool 26. The compound cross slide 24 is moved perpendicularly and radially to the longitudinal axis of the workpiece 18 by the rotation of a graduated handle 28.

Mounted upon the saddle 20 and compound cross slide 24 is an instrument attachment 30 for measuring the outer and inner diameters of workpiece 18, as best seen in FIG. 2. The measuring device 30 consists of a pair of first and second parallel bar guides 32 and 34 upon which is mounted a first and second stop block 36 and 38. A first stop mechanism 40 is mounted upon block 36 while a second stop mechanism 42 mounts upon block 38.

The first parallel bar 32 is shown mounted permanently upon the saddle 20 by a mounting block 43 and suitable mounting means, such as screws, not shown. The second parallel bar 34 mounts upon the cross slide 24 by similar mounting means. It will be understood that bars 32 and 34 may be replaced by suitable slots, such as a T-shaped slot, in the saddle 20 and cross slide 24. In such an arrangement, the blocks 36 and 38 each are provided with two T-extensions each of which slidably engages the two T-slots in the saddle 20 and cross slide 24.

In one embodiment, a lineal gauge 44 having a mounting tab extending from its lower surface, not shown, is mounted upon the first block 36 by the thread clamping action of a knob 46. The gauge 44 includes an arm 48 that extends parallel to the bars 32 and 34 for contacting the second stop means 42.

A lever arm 50 extends from block 36 at right angles thereto. The arm 50 functions to clamp the block 36 and its gauge 44 to either the first bar 32 or the second bar 34 depending on whether an inner or outer diameter cut is to be made by the lathe 10, as will be described in greater detail hereinbelow. As best seen in FIG. 3, latch arm 50 includes a rod 52 which passes through the mounting blocks 36 and 38 and terminates at a right angle bend 53. Rod 52 functions to clamp the blocks 36 or 38 to one bar 32 or the other bar 34 depending on the orientation of the latch arm 50.

Referring to FIG. 2, it will be noted that the second stop block 38 is clamped upon the bar 32 or 34 by a similar latching arm 50. The upper surface of block 38 mounts the stop mechanism 42 including, in this embodiment, a mounting bar 54 having a T-shaped slot 56 in its upper surface. Screws, not shown, extend from the lower surface of the T-shaped slot 56 into the block 38 to secure the bar 54 thereto. Slidably mounted within the slot 56 is a block 58 whose lower portion includes a T-shaped extension, not shown. Extending from the left-hand end of block 58 is a platform 60 through which passes a threaded knob 62 for securing the block 58 within slot 56. A plurality of apertures 64 pass through the block 58 parallel to the axes of bars 32 and 34. Into the aperture are mounted a plurality of equal length stop arms 66 which are secured therein by a screw 68.

Each screw 68 may be slotted or provided with a knob to make hand tightening more convenient. The reason for equality of length of arms 66 will be described hereinbelow.

The plurality of laterally aligned stop arms 66 mounted within apertures 64 may be adjusted along the longitudinal axis of each stop arm to provide a stop for the arm 48 mounted upon the first block 36. It will be seen that loosening of knob 62 will permit the block 58 to slide in slot 56 for aligning first one stop arm 66 and then another with the stop arm 48.

Another embodiment of the stop mechanism 42 which is more easily manipulated than the embodiment shown in FIG. 2 is shown in FIGS. 3 and 4. In this embodiment, the equal length stop arms 66 are mounted within a housing 70 which houses a rotary chamber 71, and is mounted upon block 38.

An adjustable housing mounting block 72, FIG. 4, is provided with a lower section 74 having a cross section shaped as a truncated pyramid that fits within a similarly shaped channel 76 in the upper surface of block 38. The truncated pyramid section 74 is retained within the channel 76 by a screw 78 that passes through a slot 80 whose lower end is relieved by an aperture 82. Tightening of the screw 78 causes the upper left-hand edge of channel 76 to clamp the lower section 74 of block 72 in the position desired to provide adjustment of the housing 70 longitudinally along the axis of workpiece 18.

It may be seen by a study of FIGS. 3 and 4 that the lateral arm 50 and rod 52 are retained within block 38 by the 90° bend of rod 52 at its lowermost point 53. This lower portion 53 of arm 52 forms a latching mechanism which latches upon rods 32 or 34. A shim 84 is secured to the block 38 by screws 86, seen in FIG. 4. The shim includes a horizontal crescent shaped portion, not shown, which engages the rod 52 at the extremes of its travel to force the rod in an upward direction thus creating a clamping pressure upon the lower portion 53 where it engages bar 32.

Housing 70 is provided with a bore, not shown, into which the cylindrical chamber 71 is inserted. Chamber 71 has a collar 90 which is grooved at 92 to receive a mounting shim 94 secured to housing 70 by screws 96. The action of shim 94 within groove 92 permits the chamber 71 to rotate but prohibits the longitudinal motion of that chamber. A plurality of bored apertures 64 pass through the chamber 71 to receive the stop arms 66 which are secured therein by a plurality of knurled knob screws 68. Loosening of screws 68 will permit the longitudinal adjustment of stop arms 66 in a radial direction to workpiece 18.

In addition to the longitudinal motion which may be imparted to stop arms 66 by loosening and tightening knob screws 68, the housing 70 may also be adjusted separately to simultaneously adjust each individual arm 66. This is accomplished by loosening a knob 98 that threadibly engages a wedge 100 which rides within a channel 102 in the upper surface of block 72. The wedge 100 clamps against a lower truncated pyramid section 104 formed in housing 70.

Referring now to FIGS. 5 and 6, the operation of the instrument attachment for measuring outer and inner diameters will be described. As mentioned above, the first bar 32 may be attached to the saddle 20 to permit a longitudinal motion with respect to the workpiece 18 but to prevent the radial motion of the bar to the workpiece. It will be understood that the saddle 20 moves in a longitudinal direction to workpiece 18 but does not move in a radial direction. Radial motion is accomplished by moving the compound cross slide 24. Mounted to the cross slide 24 is the second bar 34. The measuring device of the present invention mounted upon parallel bars 32 and 34 is conveniently located behind the workpiece 18 out of the way of normal machining operations.

After the measuring device has been properly mounted, it is necessary to locate the center of the lathe. This may be accomplished by placing a center finder, not shown, within chuck 16. A center finder is simply a cylindrical bar placed within the chuck 16 whose end includes a spring-loaded, smaller cylinder with a known diameter, 0.20 inches, for example. The cutting tool 26, mounted within tool holder 25, is brought into contact with the outer diameter of the rotating measuring surface of the center finder. Because the center finder is spring-loaded, it will seek the true center of the lathe upon contact of the tool. Assuming that an outside cut is to be made, the arm 48 of gauge 44 is then adjusted to contact the shortest stop arm 66 in block 58 on block 38 so that the gauge reads zero. The shortest stop arm 66 or all stops on block 58 are then advanced until the gauge reads 0.10. At this point, the arms 66 are clamped into a fix position.

The gauge 44 may then be removed, at the operators option, or it can be used as a reference for further cuts. If removed, the gauge is replaced by a single solid stop arm 49 whose end location is aligned with the end of removed gauge 44 using clamped arms 66 as a reference. After the tool 26 and gauge 44 or stop 49 have been backed off from the center tool and stop arm 66, the mounting block 36 will not be touched until the plurality of stop arms 66 have been adjusted. Each of the remaining stop arms 66 may be adjusted from the shortest stop or center line stop so that the distance of each stop arm from the shortest arm represents the radius of the desired cut upon the workpiece 18. The workpiece 18 is then inserted and the cutting begun. When gauge 44 or stop 49, if used, contacts the longest stop 66, the first outer diameter has been reached.

The measurement of the difference between the shortest stop arm 66 and the longest stop arm 66 shown in FIG. 5 may be accomplished prior to setting the gauge 44 to the center of the lathe. If such adjustment is done at this time, it may be accomplished by use of a vernier caliper. If adjustment of each stop 66 is done in the lathe, the gauge 44 may be retained. If a gauge is used, the gauge may be provided with a dial that reads the actual linear displacement of the arm 48 times two. Using such a gauge and 2:1 indicator scale, it is possible to measure the radius and read the indicator directly as a diameter without converting from radius to diameter in one's head.

In the arrangement shown in FIG. 2, it should be noted that the plurality of adjustable stop arms 66 in stop mechanism 42 are clamped by latching arm 50 to the bar 32 which, in turn, is connected to the radially fixed saddle 20. Conversely, the gauge 44 with its gauge arm 48, FIG. 2, is mounted upon block 36 clamped to bar 34 by latching arm 50. Thus, motion of the compound cross slide 24 will move the stop arm 48 relative to the fixed stop arms 66.

It will be seen from FIG. 5, that the first cut made by tool 26 into workpiece 18 will stop when the gauge 44 or stop 49 contacts the stop 66 extended furthest from block 58. The longest extending arm 66 may be located in either side of block 58 or in any aperture of cylinder 71.

When it is desired to make inner diameter cuts, the tool 26 is mounted in such a way that it reaches back toward the compound cross slide 24, as shown in FIG. 6. In this arrangement, the latching arms 50 are rotated at 180° so that the lower portion 53 of rod 52 now engages rod 34 rather than rod 32, as shown in FIG. 3. This causes the plurality of stop arms 66 to be permanently clamped to rod 34 and thus moved with the motion of the compound cross slide 24. Similarly, the arm 48 of gauge 44 or a single stop arm 49 mounted within the block 36, is now permanently fixed to the saddle 20 so that no radial motion will be imparted to the arm 48.

Adjustment of the plurality of stop arms 66 for inner diameter cuts is substantially the same as the adjustment of the arms for the outer diameter cuts. The main difference is that the center line is now established by the arm 66 which extends the furthest from the block 58, while the largest inner diameter cut is established by the shortest arm 66. This is because the cutting action for an inner diameter is accomplished by moving the tool out and away from the center line.

A careful review of FIGS. 5 and 6 will disclose that the arms mounted in block 58 in FIG. 5 may be removed form the T-shaped slot 56 in block 38, rotated 180° and reinserted therein. In this configuration, the equal length stop arms 66 will provide the reference stop for the plurality of inside cuts, FIG. 6, which match the cuts made on an outer diameter workpiece. By simply off setting the plurality of arms 66 a few thousandth of an inch, one can quickly create a set of reference stops for each inside cut which will permit a clearance fit with the outer diameter cuts on the mating workpiece previously machined.

An alternate arrangement to the gauge shown in FIG. 2 is shown in FIG. 7. Rather than using a gauge 44 and a center tool, not shown, a special centering tool may be used which includes a block 110 having a pair of lineal bearings, not shown, which slide over a pair of rods 112 mounted upon the saddle 20 by stand-offs 114. The upper surface of block 110 mounts a second block 116 into which a post 118 is secured to pivotally mount a centering arm 120. Centering arm 120 may be swung out of the way about post 118 or swung into a centering position to meet the cutting tool 26, as shown. In the centering position, arm 120 is located at the proper position by a step block 112 mounted upon block 110. As arranged, the tool 26 may be brought into contact with the flat end of arm 120 for aligning the tool with the dead center of the lathe.

Once the tool 26 and its cross slide 24 are located, a solid stop arm 49 may be brought into contact with the stop arm 66 to align the stop 66 with the center line of the lathe. If no gauge is used, each of the successive stop arms 66 are then adjusted from the stop arm thus aligned with the center line to establish the various diameters to be cut into the workpiece. FIG. 7 shows the arrangement of the centering piece for an outer diameter cut. If an inner diameter cut is to be made, an adjustable block 124 is provided in the end of arm 120.

As best seen in FIG. 8, the end of arm 120 is provided with a T-shaped slot 126 into which slidably fits a T-shaped extention 128 which extends from block 124. The outer end of slot 126 is plugged to permit block 124 to slide to a stopped position. At this position, a shoulder 130 on block 124 is aligned with the center line of the lathe to permit the centering of a cutting tool 26 to be used for an inside cut.

It will be understood from the foregoing description that it is possible to remove the block 38 by release of the latch arm 50. In this way, the block 38 may be stored in a toolroom with the appropriate settings of bars 66 firmly established. If one wished to make additional pieces 18 using the settings established in the stop arms 66, one would simply have to replace the block 38 upon the bars 32 and 34 and adjust the shortest arm (assuming an outside diameter were to be cut) against the gauge stop 48 so that contact of gauge stop 48 and the shortest stop arm 66 occurred at 0.10 inches from the center line of the lathe 10, as described above when a center finder is used. If the instrument of FIGS. 7 and 8 were used, the gauge would read zero.

While the present invention has been described as if a lathe were used, it will be understood that the device may also be used on a mill or jig bore. Further, the specific arrangements of blocks 36 and 38 may be reversed or otherwise varied within the teachings of the present invention. Accordingly, the present invention should be limited only by the appended claims.

I claim:

1. An instrument attachment for establishing outer and inner diameters of a workpiece mounted on the center line of a machine tool having a first, radially fixed member and a second, radially movable member that mounts a cutting tool for contacting said workpiece, comprising:
   a first bar mounted upon said radially fixed member;
   a second bar mounted upon said radially movable member; first and second block means slidably mounted upon said first and second bars;
   clamping means mounted upon said first and second block means for clamping each of said block means to said first bar and, alternately, to said second bar;
   first stop means;
   means mounting said first stop means upon said first block means;
   a plurality of second stop means;
   means mounting said second stop means upon said second block means, wherein said second block means and its plurality of stop means is clamped to said first bar mounted upon said radially fixed member to establish the outside diameter of said workpiece, and said second block means and its plurality of stop means is, alternately, clamped to said second bar mounted upon said radially movable member to establish the inside diameter of said workpiece.

2. An instrument attachment for establishing outer and inner diameters, as claimed in claim 1, wherein said first stop means includes:
   gauge means for determining the center line of said machine and single stop means for use with said second stop means after said center line has been determined and said gauge means removed.

3. An instrument attachment for establishing outer and inner diameters as claimed in claim 1, wherein said plurality of second stop means includes:
   a mounting bar;
   means slidably mounting said mounting bar upon said second block means;
   a plurality of stop bars;
   means slidably mounting said stop bars within said mounting bar for engaging said first stop means at a plurality of adjustable diameters.

4. An instrument attachment for establishing outer and inner diameters, as claimed in claim 1, wherein said plurality of second stop means includes:
   a mounting housing;
   means rotatably mounting said mounting housing upon said second block means;
   a plurality of stop bars;
   means slidably mounting said stop bars within said mounting housing for engaging said first stop means at a plurality of adjustable diameters.

5. An instrument attachment for establishing outer and inner diameters, as claimed in claim 1, additionally comprising:
   means for locating said instrument from the center line of said radius working machine; and
   said first stop means includes single stop means for use with said second stop means.

6. An instrument attachment for establishing outer and inner diameters, as claimed in claim 2, wherein:
   said gauge means is calibrated to indicate its linear displacement times two whereby said guage reads said outer and inner diameters directly without conversion.

7. An instrument attachment for establishing outer and inner diameters, as claimed in claim 1, wherein:
   said second block means having said plurality of second stop means mounted thereon is removably mounted upon said first and second bars for use as a reference instrument.

8. An instrument attachment for establishing outer and inner diameters, as claimed in claim 1, wherein said first and second bars are parallel.

9. An instrument attachment for establishing outer and inner diameters, as claimed in claim 1, wherein:
   said plurality of second stop means includes a plurality of equal length stop bars mounted upon said second block means, and
   said means mounting said second stop means upon said second block means includes a block which mounts said euqal length stop bars for 180° of rotation between first and second stop positions.

10. A device for establishing outer and innter diameters of a workpiece being worked in a machine tool having a first, radially fixed member and a second, radially movable member which mounts a cutting tool, comprising:
    first guide means mounted upon said radially fixed member;
    second guide means mounted upon said radially movable member parallel to said first guide means;
    first and second blocks slidably mounted upon said first and second parallel guide means;
    clamping means mounted upon said first and second block clamping each of said blocks to said first guide means and, alternately, to said second guide means;
    first stop means;
    means mounting said first stop means upon said first block;
    second stop means;
    means mounting said second stop means upon said second block;
    said second block and its stop means clamped to said first guide means mounted upon said radially fixed member to establish the outer diameter of said workpiece as said first and second stop means contact one another; and said second block and its stop means, alternately, clamped to said second guide means mounted upon said radially movable member to establish the inner diameter of said workpiece as said first and second stop means contact one another.

11. A device for establishing outer and inner diameters, as claimed in claim 10, wherein said first stop means is a single stop and said second stop means is a plurality of stops.

12. A device for establishing outer and inner diameters, as claimed in claim 10, wherein said first stop means is a plurality of stops and said second stop means is a single stop.

13. A device for establishing outer and inner diameters, as claimed in claim 10, wherein said first and second guide means include bar means respectively mounted upon said radially fixed and radially movable members and block means slidably mounted upon said bar means.

14. An instrument attachment for establishing outer and inner dimension of complementing workpieces to be turned about a longitudinal axis upon a machine having a first, fixed member and a second, movable member which mounts a cutting tool, comprising:
 a first bar mounted upon said fixed member;
 a second bar mounted upon said movable member;
 first and second block means slidably mounted upon said first and second bars;
 clamping means mounted upon said first and second block means clamping each of said block means to said first bar and, alternately, to said second bar;
 first stop means;
 means mounting said first stop means upon first block means;
 second stop means;
 means mounting said second stop means upon said second block means, wherein said second block means and its stop means is clamped to said first bar mounted upon said fixed member while said first block means is clamped to said second bar means to establish the outer dimension of a first workpiece, and said second block means and its stop means is, alternately, clamped to said second bar mounted upon said movable member while said first bLock means is clamped to said first bar means to establish the inner dimension of a second complementing workpiece.

15. An instrument, as claimed in claim 14, wherein:
 said second, movable member is movable in a radial direction to said longitudinal axis.

16. An instrument, as claimed in claim 14, wherein:
 said second, movable member is movable in a parallel direction to said longitudinal axis.

17. An instrument, as claimed in claim 14, wherein:
 said second stop means includes a plurality of stops mounted upon said second block means.

18. An instrument, as claimed in claim 14, wherein:
 said first stop means includes a plurality of stops mounted upon said first block means.

* * * * *